United States Patent [19]

Ehrat et al.

[11] Patent Number: 5,508,082
[45] Date of Patent: Apr. 16, 1996

[54] COMPOSITE PANELS HAVING TWO OUTER LAYERS AND A CORE

[75] Inventors: Rainer Ehrat, Schaffhausen; René Bregenzer, Neuhausen am Rheinfall, both of Switzerland

[73] Assignee: Alusuisse-Lonza Services Ltd., Switzerland

[21] Appl. No.: 208,285

[22] Filed: Mar. 10, 1994

[30] Foreign Application Priority Data

Mar. 26, 1993 [CH] Switzerland .............. 00937/93

[51] Int. Cl.⁶ .................................. B32B 18/00
[52] U.S. Cl. .................. 428/119; 428/297; 428/325; 428/328; 428/330; 428/921; 52/783.1
[58] Field of Search ................... 428/921, 323, 428/328, 330, 119, 325, 297; 52/783.1, 783.13

[56] References Cited

U.S. PATENT DOCUMENTS

| | | | |
|---|---|---|---|
| 4,927,675 | 5/1990 | Adams | 428/328 |
| 5,264,057 | 11/1993 | Schlatter | 156/39 |
| 5,277,735 | 1/1994 | Schlatter | 156/242 |
| 5,360,507 | 11/1994 | Schlatter | 156/494 |
| 5,384,004 | 1/1995 | Schlatter | 156/543 |
| 5,403,424 | 4/1995 | Ehrat | 156/247 |

FOREIGN PATENT DOCUMENTS

| | | |
|---|---|---|
| 0132936 | 2/1985 | European Pat. Off. . |
| 60-27639 | 2/1985 | Japan . |
| 2029319 | 3/1980 | United Kingdom . |

OTHER PUBLICATIONS

Chemical Abstracts, vol. 103, No. 4, Jul. 29, 1985, Abstract No. 26357s and JP 60 027 639 to Minnesota Mining and Manufacturing Co. . Feb. 12, 1985.

*Primary Examiner*—Ellis P. Robinson
*Assistant Examiner*—Timothy M. Speer
*Attorney, Agent, or Firm*—Bachman & LaPointe

[57] ABSTRACT

Composite panels with high fire-proofing capacity have two outer layers and a core that features a core mixture containing aluminum hydroxide in compacted form, lightweight fillers, in some cases fine gained or splintery aluminum hydroxide, as desired magnesium hydroxide and polymer-based binding agents. The composite panels are suitable e.g. as facade panels for building constructions.

8 Claims, No Drawings

COMPOSITE PANELS HAVING TWO OUTER LAYERS AND A CORE

BACKGROUND OF THE INVENTION

The present invention relates to composite panels having two outer layers and a core, said core featuring a mixture containing a filler material and a binding agent, and relates also to the use of such composite panels.

Composite panels with two outer layers and a core comprising a mixture of granular filler material and a binding agent are known from patent document DE-PS 28 42 858 which stipulates that the core material must contain at least 42.5 wt % $Al(OH)_3$, and that fluid, organic, reacting-type resin mixtures, i.e. essentially duroplastics must be employed as the binding agent.

Such composite panels do not satisfy all requirements as the brittleness of the binding agents limits the formability of the panels. In particular the ease and extent to which known composite panels can be bent e.g. for shaping into structural and facade elements is limited.

SUMMARY OF THE INVENTION

The object of the present invention is to propose composite panels that are easy to process and, in particular, can be shaped by forming or folding, at the same time meeting the requirements for classification as incombustable building materials or building components.

That objective is achieved by way of the invention in that the core mixture contains:

a) 35 to 60 wt % aluminum hydroxide in compacted form and having an average particle size of 0.3 to 1.0 mm, b) 15 to 25 wt % lightweight filler having an average particle diameter of 5 to 1500 μm, c) 0 to 25 wt % fine grained or splintery aluminum hydroxide having an average grain size of 10 to 30 μm, d) 0 to 20 wt % magnesium hydroxide with an average grain size of 10 to 50 μm, or 0 to 20 wt % magnesium hydroxide having an average grain size of 0.3 to 1.0 mm and e) 4 to 10 wt % binding agent based on polymers exhibiting a modulus of elasticity of 90–140 MPa and an elongation at fracture of 400–800%.

Preferred are composite panels according to the present invention having as core mixture:

a) 40 to 55 wt % compacted aluminum hydroxide having an average grain size of 0.3 to 1.0 mm, b) 20 to 25 wt % lightweight filler material having an average particle diameter of 5 to 1500 μm, c) 12 to 20 wt % fine grained or splintery aluminum hydroxide having an average gram size of 10 to 30 μm, d) 0 to 20 wt % magnesium hydroxide having an average gram size of 10 to 50 μm and e) 6 to 10 wt % binding agent based on polymers exhibiting a modulus of elasticity of 90–140 MPa and an elongation at fracture of 400–800%.

Specially preferred are composite panels according to the present invention having a special core mixture viz., a) 35 to 55 wt % compacted aluminum hydroxide with an average gram size of 0.3 to 1.0 mm, b) 20 to 25 wt % lightweight filler material with an average particle diameter of 100 to 300 μm, c) 14 to 17 wt % fine grained or splintery aluminum hydroxide having an average grain size of 10 to 30 μm, d) 14 to 16 wt % magnesium hydroxide having an average gain size of 10 to 50 μm and e) 7 to 9 wt % binding agent based on polymers exhibiting an elastic modulus of 90–140 MPa and elongation at fracture of 400–800%.

The percentage values refer in each case to the whole core mixture representing 100 wt %.

DETAILED DESCRIPTION OF PREFERRED EMBODIMENTS

Composite panels according to the present invention feature two outer layers of foil, film, strip or plate-shaped material. Such materials may be of plastics such as polyvinylchloride, polyolefins, polyamides, polyesters, fiber-reinforced artificial resins and the like, for example having a thickness of 0.1 to 5 mm. Preferred are metallic materials such as ferrous or nonferrous metals, in particular those based on iron, steel, zinc, tin, zinc-coated iron, copper, bronze, aluminum and aluminum alloys. Particularly preferred are aluminum and aluminum alloys. Usually the thickness of the outer layers is between 0.1 and 3 mm, usefully between 0.3 and 2 mm and, advantageously, between 0.5 and 1.25 mm for aluminum and aluminum alloy outer layers. Both layers may be of the same material and have the same thickness. It is also possible to have the two outer layers out of different materials. The thickness of the two outer layers may be the same or different.

One outer layer may, for example, be of metal and the other of plastic.

The plastic of the outer layers may be made fire-proof by means of fire-resistant materials. The plastic may also be reinforced e.g. by means of fibers or e.g. may be foamed.

The core may be of the said mixture, or of several layers of the same or different such mixtures and, if desired, the layers separated from each other by one or more layers of large surface area materials such as metal foils, strips or plates, papers, boards, plastic films, and/or plastic sheets.

Possible for example are composites having two outer layers and, between them, a core comprising a metal foil such as e.g. an aluminum foil on both sides of which there is a layer of core mixture.

The outer layers may for example be joined to the core material by means of the process described in EP A 0 423 074. If under the given conditions the core mixture exhibits adequate bonding properties, then it may be bonded directly to the outer layers. To bond the outer layers permanently to the core material, it is also possible to provide, between the outer layers and the core, adhesives or bond-promoting agents or other aids to adhesion such as adhesive strips. The same principle applies to other types of core made up of two or more core layers featuring, if desired, large surface area materials in between.

The types of aluminum hydroxide of grain size 0.3–1 mm employed according to the invention are in practice compacted or granulated. As a rule they are broken down to the given grain size by means of grinding. The minimum gain size may for example be 0.2 mm, the maximum grain size 1.5 mm. It may also comprise technical aluminum hydroxides of 99.5% $Al(OH)_3$, the remainder being typical impurities resulting from processing.

The fine grained or splintery aluminum hydroxide with an average grain size of 10–30 μm exhibits a minimum grain size of e.g. 5 μm and a maximum grain size of 50 μm. Such fine particulate aluminum hydroxide can, for example, be manufactured using special nucleating methods in the Bayer process or precipitated from a highly diluted caustic aluminate solution.

On heating the aluminum hydroxide to over 200° C. it releases water endothermically according to the equation $2AL(OH)_3 \rightarrow Al_2O_3 + 3H_2O$.

The enthalpy of the reaction at 700K is 250 kJ/kg, which explains why aluminum hydroxide is flame retarding. The heat consumed for the decomposition of $AL(OH)_3$ and the resultant vaporization of water impedes the access of oxygen.

Lightweight filler materials are for example scorified lava, pumice, additions of alumina, clay, flue dust and refuse for example processed wet for granulation purposes and swollen up by vaporizing the water, expanded clay, hollow spheritic corundum, coal cinders, brick frees, vermiculites, perlites, expanded mica, expanded perlite, kieselguhr, expanded sand, granulated stone etc.

The lightweight filler materials usefully have a particle size of 5 to 1500 µm, preferably 200 µm and less, and in particular 100 to 300 µm, or 100 to 200 µm.

Specially preferred lightweight filler materials are hollow glass spheres and foamed glass. Hollow glass spheres and foamed glass can be manufactured for example from silica glasses containing boron oxide, aluminum oxide, sodium oxide or lead oxide; aluminum silicate hollow glass spheres are preferred. The density of hollow glass spheres may be for example from 0.4 to 0.9 g/cm$^3$ (apparent density).

Specially preferred lightweight filler materials are hollow glass spheres e.g. made of silica glasses containing aluminum oxide, 5 to 500 µm in size and having an average diameter 100 to 300 µm.

The lightweight filler materials employed in the core usefully represent 20 to 25 wt % of the core.

In composites according to the invention the core mixture contains 4 to 10 wt % of a binding agent based on polymers exhibiting an elastic modulus of 90–140 MPa and an elongation at fracture of 400–800%. Preferred core mixtures contain 6 to 10 wt %, in particular 7 to 9 wt % binder. Binding agents that may be employed are for example polymers, polymer mixtures, homopolymers or co-polymers, usefully thermoplastics, that are based on polyolefins.

Examples of thermoplastics based on polyolefins are polyethylene, e.g. high 35 density polyethylenes (HDPE, density greater than 0.944 g/cm$^3$), medium density polyethylene (MDPE, density 0.926–0.940 g/cm$^3$) linear medium density polyethylene (LMDPE, density 0.926–0.940 g/cm$^3$) low density polyethylene (LDPE, density 0.910–0.925 g/cm$^3$), and linear low density polyethylene (LLDPE, density 0.916–0.925 g/cm$^3$), polypropylene, atactic, isotactic, amorphous and crystalline polypropylene, and any desired mixtures thereof, poly-1-butene, poly-3-methylbutene, poly-4-methylpentene and copolymers thereof, such as e.g. of polyethylene with vinyl-acetate, vinyl-acetate and acrylic esters, vinyl-alcohol, acrylic acids, e.g. ionomer resins, such as copolymers of ethylene with about 11% acrylic acid, methacrylic acid, maleic acid, acrylic acid esters, maleic esters, methacrylic esters, tetrafluor-ethylene or polypropylene and mixtures, random copolymers, block polymers or olefinpolymer-elastomer mixtures thereof. Polyethylene and polyethylene-copolymers are preferred.

Useful core mixtures contain 6 to 10 wt % of a binding agent mainly containing polyethylene.

Particularly useful as binding agents are thermoplastics based on polyolefins that are available as starting materials in powder or granular form with a grain size of 10 to 30 µm. Of the thermoplastics at this grain size particular preference is given to copolymers of polyethylene with heteropolymers, such as e.g. ethylene, grafted polymers containing 5 to 25% acrylic acid or acrylic acid esters and maleic acid or maleic acid esters.

The core mixtures may contain further agents. Preferred are core mixtures containing smoke inhibitors.

As smoke inhibitors mention can be made, by way of example, of zinc chlorate, $Zn(BO_2)_2 \cdot H_2O$ or $2ZnO \cdot (B_2O_3) \cdot (H_2O)_{3.5}$ or active substances of the metallocene type, in particular ferrocenes, or of the metal-acetyl-acetoneates. The smoke inhibitors may in particular be in the form of free powder, e.g. with a particle size of 30 to 80 µm.

The smoke inhibitors may be employed in amounts of, for example, up to 3 wt %, usefully 0.1 to 0.5 wt % with reference to the core mixture.

According to the present invention the core mixture can also contain organic or inorganic fibers in amounts e.g. of up to 3 wt %, usefully from 0.1 to 0.3 wt %. Examples of such fibers are cellulose-containing fibers such as cotton or rayon fibers, wool fibers, polyamide, polyolefin or polyester fibers, carbon fibers and preferentially inorganic fibers such as glass, glass-ceramics, mineral fibers, slags, carbon, boron or metal fibers. Preferred are glass, glass ceramics and mineral fibers. The fibers can have a length of 3 to 4 mm and a diameter of 5 to 50 µm.

The core mixture can for example be manufactured by mixing the various components e.g. dry mixing in a mixer for solids e.g. a force-mixer, screw-type mixer, tumble-mixer or fluid mixer or other mixer operating in a continuous or discontinuous manner.

When manufacturing composite panels with two outer layers and a core, where the core comprises a mixture containing filler material and binding agents, the core mixture can be prepared by mixing the individual components and is based on polymers exhibiting a modulus of elasticity E of 90–140 MPa and an elongation at fracture of 400–800%, preferably based on a polyolefin and having an average grain size of 10 to 30 µm.

The further processing of the core mixture and the outer layers into composite panels may, for example, be according to a process such as is described in EP-A 0 087 546 or EP-A 0 423 074.

The composite panels according to the present invention may, for example, be manufactured by one of the above mentioned processes, in particular involving the application of pressures of 1 to 50 bar, usefully 5 to 25 bar, and simultaneously temperatures of 120° to 250° C., usefully 220° C., in particular using a band-type press. The outer layers are thereby joined permanently to the core, if desired with the aid of adhesive means such as adhesive films and the core hardens under the influence of pressure and heat. The composite panels manufactured in such a manner can be processed further according to requirements, for example, cutting to size by e.g. sawing, milling or shearing or provided with recesses by boring or cutting. It is also possible to shape the panel, for example by bending or folding, for which operations it is helpful if one of the outer layers, in particular the one on the inner side of the bend radius, is provided with one or more notches or slits. The notches or slits may extend into the core.

On bending, the core which is bonded with thermoplastics is able to accept the bending action, and the outer lying layer, supported by the core or residual part of the core, exhibits a smooth edge along the line of bending.

The present invention relates also to the use of the composite panels according to the invention for building materials, facade panels, cladding on building constructions, dividing walls in buildings, in vehicle manufacture, shipbuilding, and in equipment and machine manufacture.

Preferred is their use as bendable building materials such as facade panels, cladding on building constructions, or dividing walls in buildings, vehicles and ship structures and in equipment and machine manufacture.

The composite panels according to the invention are characterised by way of their extremely high resistance to heat and combustion. Also in fires the panels generate only small amounts of combustion gases. The combustion gases are largely harmless as the polyolefins employed combust to give $CO_2$ and water and the inorganic components release at most water. The composite panels according to the invention meet the classification requirements e.g. of DIN 4102 A2 (fire protection standard).

All details in percentages or fractions refer to weight unless otherwise indicated.

EXAMPLE 1

A charge was prepared containing 22.4 wt % hollow glass spheres, 54.2 wt % compacted aluminum hydroxide, 15.6 wt % fine grained aluminum hydroxide, 7.6 wt % binding agent and 0.2 wt % smoke inhibitor. The mixture was prepared by adding the components individually to the mixer and mixing for one minute. A 5.3 mm layer of the mixture was placed on a lower outer layer and covered by a top outer layer. The upper and lower outer layers were of 0.5 mm thick aluminum sheet or strip. The three layers were converted to a composite in a press applying a pressure of $20 \times 10^5$ Pa at 190° C. for 1 min. The thickness and density of the resultant composite panel were 3 mm and 1.45 g/cm³ resp.

EXAMPLE 2

The procedure was the same as in the first example. The components for the core mixture were, however, as follows:
 22.4% hollow glass spheres
 39.2% compacted aluminum hydroxide
 15.6% fine grained aluminum hydroxide
 15.2% magnesium hydroxide
 7.6% binder

EXAMPLE 3

The procedure was the same as in the first example. The components for the core mixture were, however, as follows:
 22.4% hollow glass spheres
 39.0% compacted aluminum hydroxide
 15.6% fine grained aluminum hydroxide
 15.2% magnesium hydroxide
 7.6% binder
 0.2% fibers

EXAMPLE 4

The procedure was the same as in the first example. The components for the core mixture were, however, as follows:
 22.4% hollow glass spheres
 54.0% compacted aluminum hydroxide
 15.6% fine grained aluminum hydroxide
 7.6% binder
 0.2% smoke inhibitor
 0.2% fibers In all examples the hollow glass spheres were of aluminum silicate glass and had an average diameter of 100 μm, the compacted aluminum hydroxide had a grain diameter of 0.5 to 1.0 μm, the fine grained aluminum hydroxide had a grain diameter of 25 to 50 μm, the magnesium hydroxide had an average grain diameter of 25 to 50 μm, the binder was a terpolymer containing mainly polyethylene, the smoke inhibitor was a ferrocene, and the fibers were 3 mm glass fibers.

We claim:

1. Composite panel which comprises two outer layers parallel to a core, wherein the core includes a mixture containing a filler material and a binding agent, wherein the core mixture contains:

a) 35 to 60 wt % aluminum hydroxide in compacted form and having an average particle size of 0.3 to 1.0 mm, b) 15 to 25 wt % lightweight filler having an average particle diameter of 5 to 1500 μm, c) at least one member selected from the group consisting of fine grained aluminum hydroxide having an average grain size of 10 to 30 μm and splintery aluminum hydroxide having an average grain size of 10 to 30 μm present in said core mixture in an amount of up to and including 25 wt %, d) at least one member selected from the group consisting of magnesium hydroxide having an average grain size of 10 to 50 μm and magnesium hydroxide having an average grain size of 0.3 to 1.0 mm present in an amount of 0 to 20 wt %, and e) 4 to 10 wt % binding agent derived from polymers exhibiting a modulus of elasticity of 90–140 MPa and an elongation at fracture of 400–800%.

2. Composite panel according to claim 1, wherein the core mixture contains:

a) 40 to 55 wt % compacted aluminum hydroxide having an average grain size of 0.3 to 1.0 mm, b) 20 to 25 wt % lightweight filler material having an average particle diameter of 5 to 1500 μm, c) 12 to 20 wt % of at least one selected from the group consisting of fine grained aluminum hydroxide having an average grain size of 10 to 30 μm and splintery aluminum hydroxide having an average grain size of 10 to 30 μm, d) 0 to 20 wt % magnesium hydroxide having an average grain size of 10 to 50 μm, and e) 6 to 10 wt % binding agent based on polymers exhibiting a modulus of elasticity of 90–140 MPa and an elongation at fracture of 400–800%.

3. Composite panel according to claim 1, wherein the core mixture contains:

a) 35 to 55 wt % compacted aluminum hydroxide having an average grain size of 0.3 to 1.0 mm, b) 20 to 25 wt % lightweight filler material having an average particle diameter of 100 to 300 μm, c) 14 to 17 wt % of at least one selected from the group consisting of fine grained aluminum hydroxide having an average grain size of 10 to 30 μm and splintery aluminum hydroxide having an average grain size of 10 to 30 μm, d) 14 to 16 wt % magnesium hydroxide having an average grain size of 10 to 50 μm, and e) 7 to 9 wt % binding agent based on polymers exhibiting an elastic modulus of 90–140 MPa and elongation at fracture of 400–800%.

4. Composite panel according to claim 1, wherein the core mixture contains hollow glass spheres as filler material.

5. Composite panel according to claim 1, wherein the core mixture contains up to 0.5 wt % smoke inhibitor, with reference to the weight of the core mixture.

6. Composite panel according to claim 1, wherein the core mixture contains fibers in amounts up to 3 wt % with reference to the weight of core mixture.

7. Composite panel according to claim 1, wherein the binder in the core mixture amounts to 6 to 10 wt % of the core weight and contains polyethylene.

8. Composite panel according to claim 1, wherein the core mixture contains 12 to 20 wt % fine grained or splintery aluminum hydroxide having an average grain size of 10 to 30 μm.

* * * * *